United States Patent [19]
Porsbo et al.

[11] Patent Number: 5,898,650
[45] Date of Patent: Apr. 27, 1999

[54] CD PLAYER WITH LINEAR ARRAY OF STATIONARY DISC HOLDERS

[75] Inventors: Michael Porsbo, Struer; Jan Olesen, Holstebro; Henrik Fløe Mikkelsen, Kjellerup; Bent Larsen, Struer, all of Denmark

[73] Assignee: Bang & Olufsen A/S, Struer, Denmark

[21] Appl. No.: 08/770,144

[22] Filed: Dec. 19, 1996

[30] Foreign Application Priority Data

Dec. 19, 1995 [DK] Denmark .................................. 1439/95
Dec. 19, 1995 [DK] Denmark .................................. 1440/95

[51] Int. Cl.⁶ ........................... G11B 17/22; G11B 17/04
[52] U.S. Cl. ............................................. 369/39; 369/178
[58] Field of Search ............................... 369/36, 39, 75.2, 369/178, 191, 197, 34, 37, 268, 292

[56] References Cited

U.S. PATENT DOCUMENTS

| | | | |
|---|---|---|---|
| 4,365,326 | 12/1982 | Oshawa et al. | 369/268 |
| 4,773,058 | 9/1988 | Petruchik et al. | 369/77.2 |
| 5,197,057 | 3/1993 | Iyama et al. | 369/37 |
| 5,218,592 | 6/1993 | Isshiki et al. | 369/75.2 |

FOREIGN PATENT DOCUMENTS

| | | |
|---|---|---|
| 0506458 | 3/1992 | European Pat. Off. . |
| 6-195838 | 7/1994 | Japan . |

Primary Examiner—Stuart S. Levy
Assistant Examiner—Kenneth W. Fields
Attorney, Agent, or Firm—Sixbey, Friedman, Leedom & Ferguson; David S. Safran

[57] ABSTRACT

A player apparatus for compact discs (CD discs) and similar signal carriers, has a playing station designed to hold and rotate CD discs and a pick-up device for detecting signals from the discs and is of the type which has a magazine for two or more discs and a device for selectively bringing any of these discs into and out of operative engagement with the playing station. The player is also provided with a number of stationary disc holder stations arranged in a linear formation on a chassis so as to be operable to hold a linear row of discs side by side in a common plane, while at least the pick-up device of the playing station is provided on a sledge that can be displaced along the chassis so as to be selectively operatively engageable with the individual discs in the row of discs. The entire row of discs is visually exposed except for any station covered by the playing station. A control is provided for effecting stoppage of played discs in positions with generally the same orientation of imprints on the discs, in which an associated memory unit serves to register an identification signal of each new disc in a relevant disc collection and, in response to initial playing of the disc, also serves to register the angle of rotation of the disc from a starting position thereof to a position in which the pick-up device detects the passage of a 'pause bit' of the CD disc, so that the memory unit will thereafter effect stoppage of the rotation of the disc with an orientation corresponding to the orientation with which it was originally placed in the player.

4 Claims, 3 Drawing Sheets

CD PLAYER WITH LINEAR ARRAY OF STATIONARY DISC HOLDERS

BACKGROUND OF THE INVENTION

1. Field of the Invention

The present invention relates to a player apparatus for compact discs (CD discs) and similar signal carriers, comprising a playing station with means for holding and rotating such discs and pick-up means for detecting the signals thereof, and further of the type comprising a magazine for two or more discs and means for selectively bringing any of these discs into and out of operative engagement with the playing station.

2. Description of Related Art

For handling of the said CD discs there are known two different types of disc magazines, viz. one in which the discs are held in a pile in face to face relationship and one in which the discs are supported lying on a carrousel structure in a common plane. The first type requires a rather complicated mechanism for transferring the discs between the magazine and the playing station, but an advantage is that the magazine can hold a large number of discs in a very compact manner; the system is well suited for professional use, but it is less suited for an elegant design as a domestic appliance. The carrousel type is mechanically simpler, but it is not either well suited for domestic use because the carrousel will typically have such a large diameter that the apparatus cannot be placed on a shelf of an ordinary depth dimension.

Besides, for both types of magazine units it applies that the user cannot readily identify the discs housed therein despite identifying imprint on the individual discs, as the magazines appear as closed units. Also, the user cannot change out any discs in the magazine during the playing of any other discs.

SUMMARY OF THE INVENTION

With the present invention it has been found possible to drastically change these and other conditions in arranging for the discs to be placed in stationary discs holder stations arranged on a chassis in a linear formation so as to hold the discs lying in a row in a common plane, while the pick-up means and preferably also the driving means for disc rotation are provided on a sledge operable to be displaced along said chassis so as to be selectively operatively engageable with the different discs.

Thus, the player device can be designed as an elongated, relatively narrow unit, with a depth dimension not much larger than the diameter of the CD discs, whereby it is well suited to be placed on a shelf. In the longitudinal direction no extra space will be required, as the magazine structure itself is fully stationary.

It could be possible to make use of a central or common driving system for all of the discs, such that only the pick-up means should be shifted from disc to disc, but it has been found preferable to include even the driving means in the shiftable system so that only the selected disc is rotated. This implies that even during playing it will be possible to identify the other discs in the magazine, e.g. for determination of the next selection, should the playing sequence not be pre-selected. The discs can be seen either directly or through a transparent cover lid.

In principle, any disc not being played may be freely accessible for changing.

The shiftable sledge, carrying only the pick-up head and a disc drive, is a lightweight unit which can be moved very rapidly from one disc to another, in practice as rapidly as corresponding to the pause between two consecutive tracks on a CD disc.

The said disc holder stations may be provided with clamping means for effectively holding the discs in the required accurate positions, the clamping of a disc being automatically released whenever the disc is to be played. Therefore, in its preferred design the player can be used with any orientation, be it standing horizontally or in a sloping position on a shelf or hanging on the wall, whether horizontally or vertically.

As mentioned, with the preferred design of the player the discs in the stations will be directly visible, this implying a problem with respect to a uniform orientation of the imprints on the discs. A desirable neat appearance of the player will be partly spoiled if the discs, after stoppage, assume arbitrary, different orientations, because they are normally provided with a rather dominant imprint. On this background and as explained in more detail below the invention also provides for means enabling a stoppage of the discs with a desirable uniform orientation.

BRIEF DESCRIPTION OF THE DRAWINGS

In the following the invention is described in more detail with reference to the drawing, in which.

DETAILED DESCRIPTION OF THE INVENTION

Figure 1:
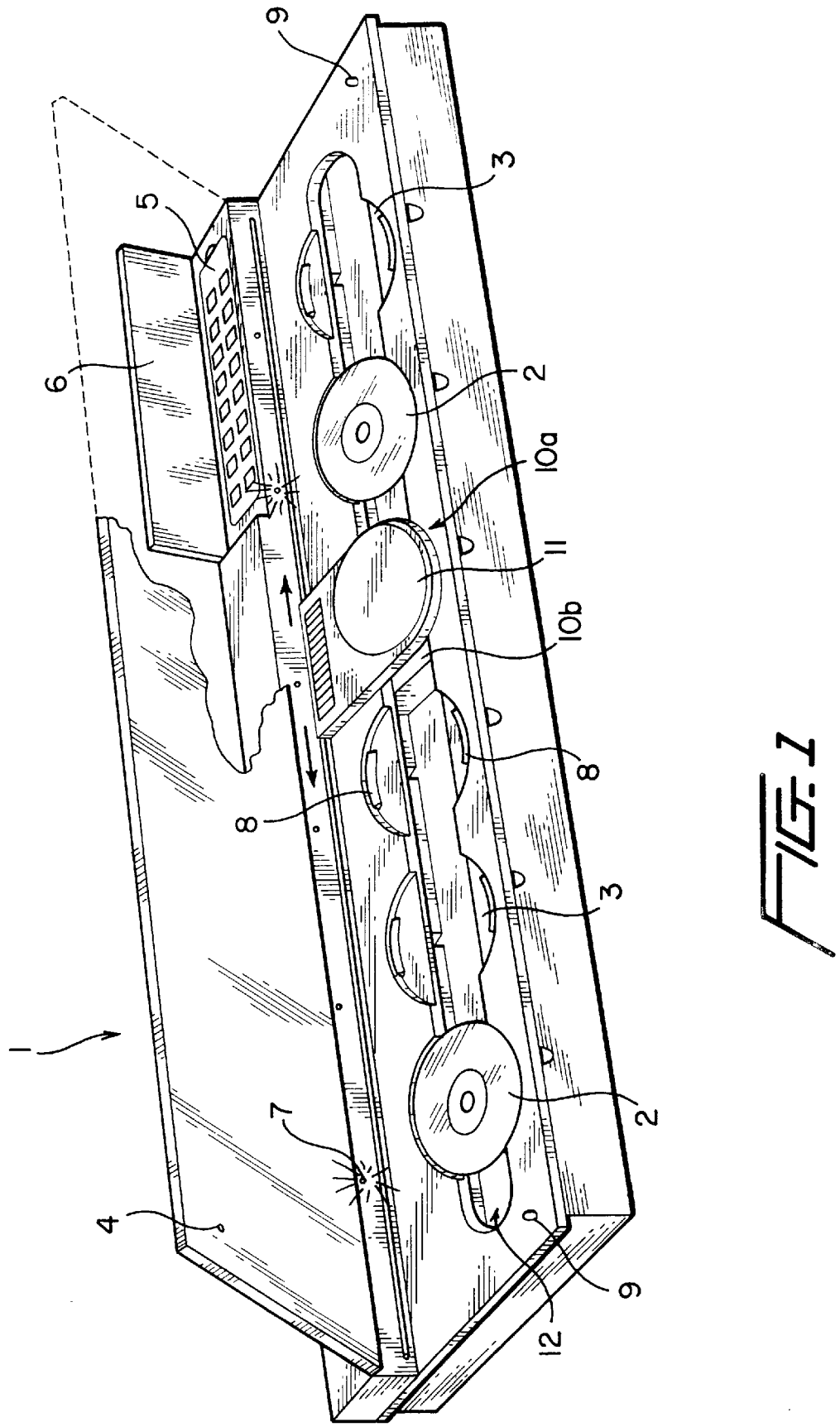
FIG. 1 is a perspective view of a multi CD player according to the invention.

FIG. 1 shows a multi CD player of the present invention, made with six playing stations 3 arranged in line and also serving as holding units for CD discs. As shown, a playing unit 10 is arranged as a sledge for linear movement made with a top portion 10a and a bottom portion 10b. The latter, which co-operates with the top portion 10a, is guided in a trench 12 underneath the discs 2.

By means of non-illustrated driving means, e.g. of the linear motor type, the sledge 10 can be displaced along a line between the playing stations 3, optionally with very high speed, and it can be rapidly and accurately positioned at or in a selected playing station 3, in as far as an accurate positioning will not require movements other than the linear displacement and the associated locking. During displacement directly between the two extreme positions the sledge 10 may reach a speed of about 100 km/h.

In order to protect the sledge 10 and the users against damages in connection with this movement the CD player is provided with a lid 4, preferably made of transparent glass. Besides, in the slot between the lid 4 and the player top side, in which the holding stations 3 are provided, there is placed on this top side a photo sensor system 9 responding to intrusion of any object under the lid 4, causing the sledge 10 to stop by such a detection. Also, the sledge is stopped in response to lifting of the lid. When the lid is open the sledge can still be shifted, though now with low speed only. Any disc can be played, and the other discs are accessible for changing.

Figure 2:
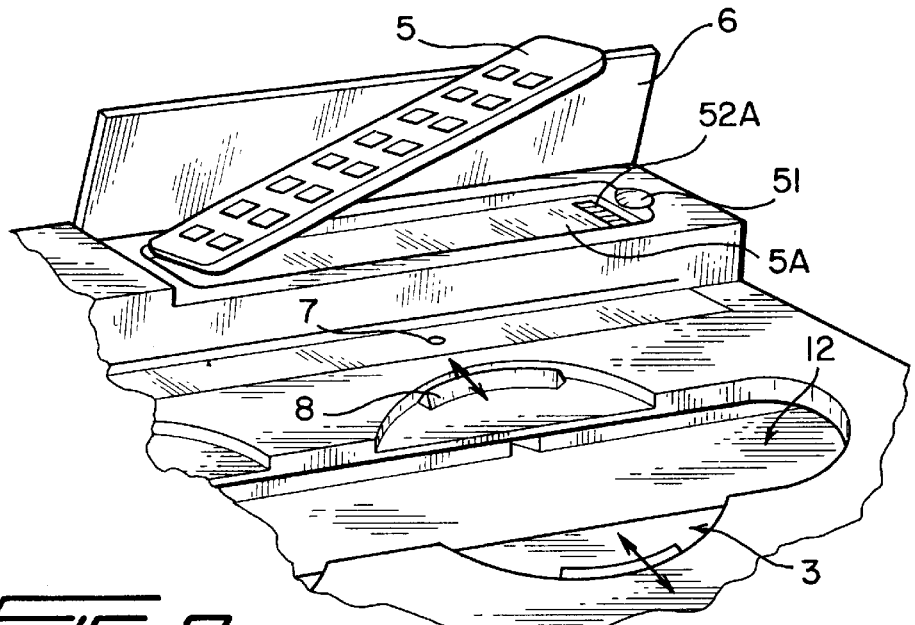
FIG. 2 is a perspective fractional view of the player, showing a control unit thereof.

Underneath a top lid 6 the player 1 is provided with a control panel unit shaped as a flat elongate unit 5 (see also FIG. 2). The player may be operated via a remote control (not shown) as well as directly by way of control buttons on the unit 5 and/or by single buttons at each station of the player. The buttons of the control unit 5 may also refer to a radio receiver incorporated in the player.

Figure 3:
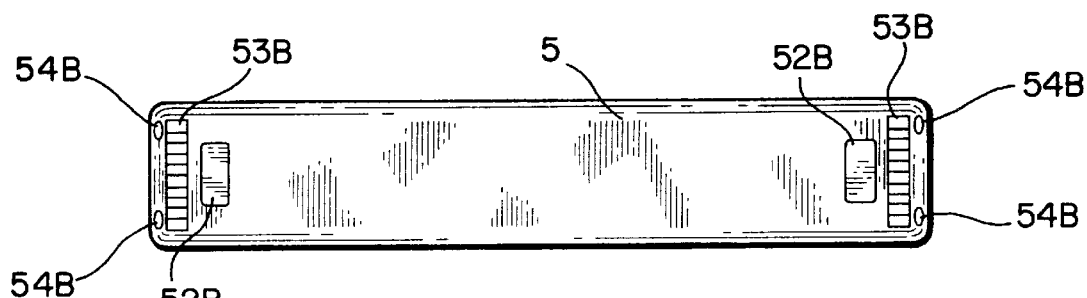
FIG. 3 is a plan view of the rear side of the control unit.
Figure 4:
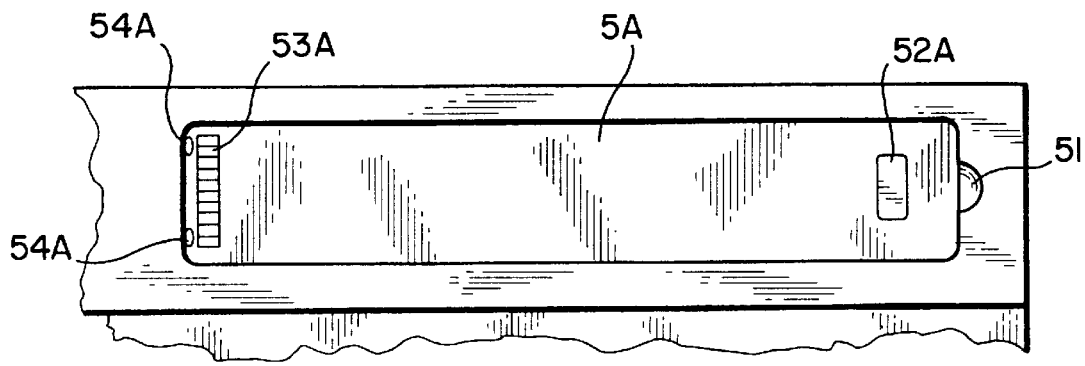
FIG. 4 is a plan view of a depression in which the control unit is mounted.

The control unit 5 is releasably held in a depression 5A in the top side of the player, raisable therefrom by introduction of a finger tip in a recess 51, see also FIG. 4. Next to this recess there is placed in the depression 5A a permanent magnet 52a co-operating with an anchor piece 52b at the rear side of the control unit 5 (FIG. 3). At the opposite end of the depression 5a there is mounted a contact terminal 53a co-operating with corresponding contacts 53b on the bottom side of the control unit. At this end there is also provided engagement portions 54a for receiving complementary holding portions 54B on the control unit 5.

As apparent from FIG. 3 all of the elements 52b, 53b and 54b are doubled such that the opposed ends of the rear side are designed fully identically. It is thus achievable that the control unit 5 can be turned so that the text of the control buttons on its front side may always be easily readable, irrespectively of the orientation of the player, e.g. when placed on a shelf in a slanting position with the row of holding stations 3 placed either top- or bottomwise. Correspondingly, detector means may be provided for sensing whether the control unit 5 is turned one way or the other, in order to adjust the showing of the display 11 correspondingly, this display being further mentioned below.

To ensure an accurate positioning of the CD discs in the holding stations 3 each of these stations 3 is provided with two diametrically opposed jaws 8 (see FIGS. 1 and 2). These jaws 8, which are mounted in connection with spring means, may receive a CD disc in that a disc is laid against one jaw 8 and thereafter, with a light pressure, pressed down at the opposite jaw 8, whereby a precise and effective holding of the disc 2 will be established. The jaws 8, which are shaped with rounded contours with a radius corresponding to that of the CD discs, exert a light pressure against the edge of the disc 2, thus holding the disc in position such that the playing unit 10 may take over the holding of the disc 2 for the playing thereof, while associated control means serve to withdraw the jaws as long as the disc is engaged by the playing unit 10.

The top portion 10a of the playing unit 10 is provided with a display 11 for showing information pertaining to the actual CD disc as actuated by the playing unit. Relevant information can be as read from the disc or, partly, user defined information stored by the user in the memory of the multi CD player, along with information having been automatically stored in the memory in connection with the reading in of the information of the CD disc.

In connection with each of the magazine units 3 there is mounted an indicator lamp 7 indicating the presence of a CD disc in that unit.

As briefly mentioned above, it will be desirable that the CD discs be stopped with a uniform, well defined "upright" orientation.

Basically, this would require a detectable marking on the disc itself, at a standardized place relative to the orientation of the imprint, which will be a fully realistical possibility in connection with future discs. By way of example, al imprints should be effected with a characteristic, detectable detail at a certain place in the imprint picture, or the imprint should be correctly oriented relative to a detectable marking on the disc body Itself. Another, at least theoretical possibility will be that the users themselves may effect a relevant marking such as application of a small mirror wafer at a standardized spot of the disc or a filing of a small notch in the periphery of the disc, which may of course be provided on or in new discs.

However, in connection with the invention it is not really expected that it will be realistically possible to accomplish such a standardization, and it has been found possible to make use of a system, with which it is pre-supposed that the user wishing to achieve the said result will have to contribute to such an achievement, namely by the simple precaution that each new disc is placed in the player with the orientation with which it is desired to be stopped or delivered. When thus the disc has been loaded with correct orientation, the control problem will be reduced to a registration of the start position of the disc drive itself and a later stop positioning in just that position.

This problem can be solved in a principally simple manner with the use of tachometering, preferably in connection with a detector for registration of each full revolution of the disc drive. In the initial phase it is then possible to count tachometer pulses until the "round mark" is detected, while the stop the control can be effected based on a complementary counting of tachometer pulses after the last passage of the round mark. Alternatively, after an operational stop with an arbitrary orientation the disc can be restarted with reversed direction and counting of the first registered number of tachometer pulses upon a detected passage of the round mark. The tachometer pulses may be imitated by the use of a stop motor for producing the initial and the final rotation phases, and still a relevant control may be established in other possible manners.

As far as principles are concerned, the invention goes a further stop, viz. in comprising a logging of a smaller or higher number of discs, e.g. 50–300 discs, for registration of their identity and the relevant stop position of each of the discs relative to a marking present on the recorded discs themselves, even though the imprints are not orientated accordingly. There may be—or come in the future—other usable markings, but the said existing marking refers to the so-called P-bit which, as a prescribed standard, is 'recorded' in the data track between the indication of the table of contents and the first signal track. All CD playing equipment is already adapted to detect this 'pause bit', at which the reading head of the player should pause, waiting for an order to initiate playing of the first or any other selected sequence of the disc. This bit does not take up much space in the data track, so it con be considered as a point which, for the purpose of the invention and with sufficient accuracy, may form a reference basis for an angular positioning of the disc.

Now, even this detectable marking will not be directly unable for the desired automatic stop control, if or when the imprint on the disc is not angularly orientated with reference to the location of the marking. According to the invention, however, it will nevertheless be relevant to record the angular Location of this P-bit relative to the desired stop position of the individual disc, as it will then no longer be a condition that the already logged disc be loaded with any specific orientation; it will be stopped with the desired correct orientation anyway, when an associated memory has been informed of the angular location of the fixed disc marking relative to the indicated start/stop position of the disc from the first time it way played. Even this will merely be a matter of counting tachometer pulses.

Figure 5:
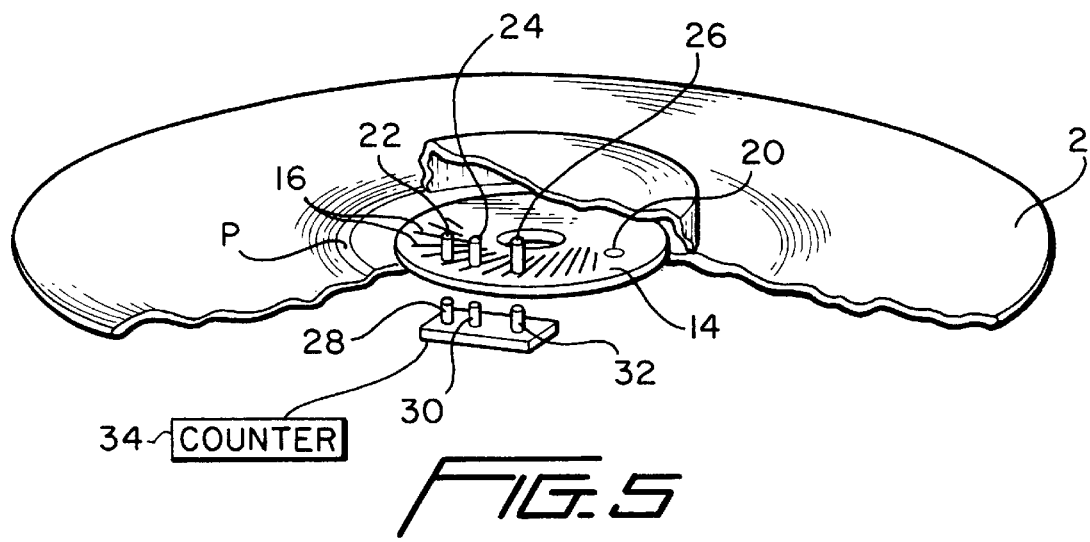
FIG. 5 is a schematic perspective view of a stop control system used in the player of FIG. 1.
Figure 6:
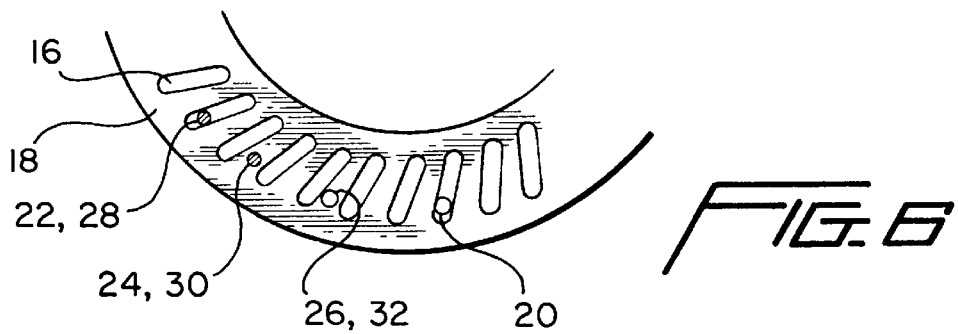
FIG. 6 is a top view of a tachometer disc of that system.

In the following this aspect of the invention is explained in more detail with reference to FIGS. 5–7:

in FIG. 5, a CD disc 2 is indicated laid into a conventional CD drive, in which only the upper magnet clamp disc is connected with a plastic disc 14 having along its periphery a row of tachometer lines 16, preferably provided as shown in FIG. 6 by printing with an IR-barring paint 18, in which the lines 16 occur as radial IR transparent subareas. At a single place of the periphery there is provided a throughhole 20, which may thus be penetrated by visible light, unlike the line areas 16 in as far as the plastic disc 14 is dark coloured.

In the player and above the disc 14 there is mounted three fixed lamps, viz. two IR lamps 22 and 24 and a lamp 26 for visible light, while below these and in this embodiment below the translucent central area of the CD disc there is mounted corresponding, respective sensors 28 and 30 for IR light and 32 for visible light. These sensors are connected to a signal processing and counting nit 34. It should be noted that the sensors will preferably be mounted in a space between the tachometer disc 14 and the top side of the CD disc 2, whereby the light shall not pass through the CD disc.

The pairs of lamps and sensors 22,28 and 24,30 are mounted in a manner such that compared to the lines 16 they occur with a distance slightly different from the pitch of the lines. Thus, as shown in FIG. 6 the pair 24,30 will be located in the IR dark area just outside the edge of a line area 16 when the pair 22,28 is located midways in another line area 16. in connection with the initial rotation of the CD disc this will enable the said signal processing unit to determine whether the disc rotates one way or the other. This is relevant because in most CD drives it occurs that the accurately controlled variable speed driving motor may start rotating rearwardly and perhaps fluctuate a couple of times around the starting position before starting effectively, and in connection with the invention it is desirable to count tachometer pulses only forwardly from the effective start. Thus, this may be ensured with the use of the signal processing unit.

Figure 7:
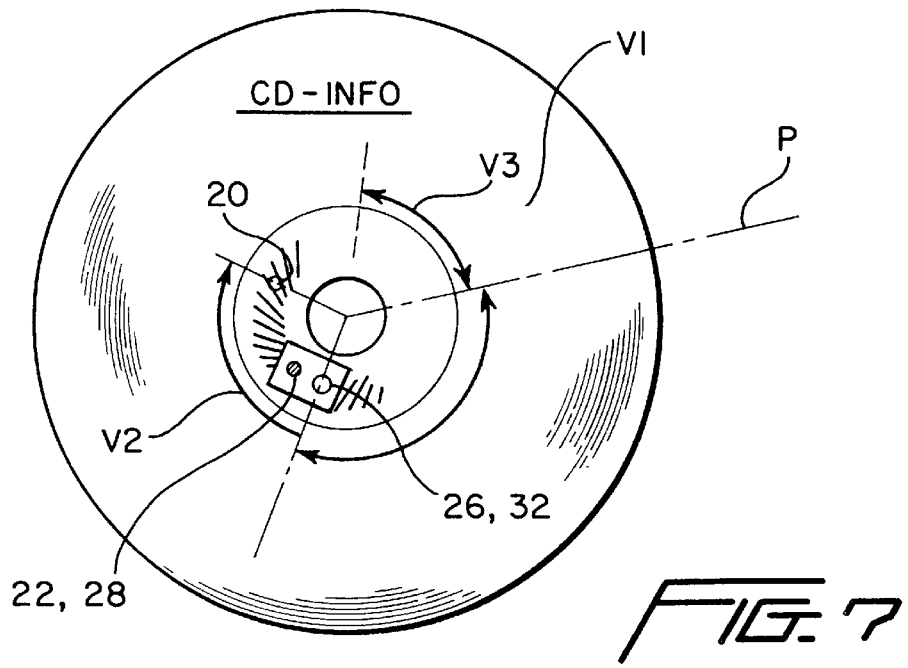
FIG. 7 is a top view of a CD disc with different angle markings.

Hereafter and with reference to FIG. 7 it will be sufficient to refer to the lamp and sensor pair 22,28 as the means enabling an effective forward counting of tachometer pulses from actual operative start of the CD discs.

This counting in the unit 34 is maintained until the visual hole 20 passes the lamp and sensor pair 26,32 for visible light, whereby it is determinable how large the angle of rotation is between the factual starting position and the subsequent passage of the 'round hole' 20 past the detector 26,32.

When this angle of rotation is registered in an associated memory it will thereafter, controlwise, be a well defined and in principle simple job to effect a later stoppage of the rotation of the CD disc in precisely or almost the same angular position as the one the effective rotation was started, as this will be a matter of counting tachometer pulses upon the last passage of the round mark 20 and an associated, controlled braking of the CD drive.

Thus, a CD disc loaded with a correct orientation will be brought to stop with the same orientation as primarily desired.

In FIG. 7 this is illustrated by a certain angle V1 occurring between the location of the round mark 20 and measuring position 26,32 where the passage thereof is detected. For a full stop the disc should then be rotated through the complementary angel V2 after the last passage of the hole mark in order to stop the CD disc with its desired orientation. This information, then, may be used for the control of the braking of the drive motor.

The reference letter P denotes the said P-bit point on the individual CD disc. The point is located somewhere near the inner periphery of the signal track, where the playing is initiated. When the CD detector detects the occurrence of this point the tachometer counting onwards from the starting position will be indicative of the shown angle V3 between the "up"-direction and the peripheral location of the point P being measured, and this value may be read into a memory unit together with a disc identification derivable from the initial playing sequence.

This information may be utilized for the controlled stoppage of the CD disc with a correct orientation as an alternative to the method described above, as it will now in an absolute sense be known into which angular position the P-mark should he rotated relative to another, known and fixed position angular position, viz that of the CD pickup head. Hereby the angle V3 should be corrected by the angle to the "up"-direction of the imprint, which correction, however, will be a simple apparatus constant. When the CD detector during the stop phase detects the passage of the P-point it will be possible, therefore, to automatically cause the stop braking of the drive motor to be effected by a tachometer counting to the angle V3 plus/minus the said apparatus constant, whereby the disc is finally stopped with the desired orientation.

It is thus achievable that a disc, which has previously been registered with its correct orientation in the said memory, may later on be loaded into the player with any arbitrary orientation and yet thereafter be stopped in its correct position.

It has been found that it is hereby possible in an economical manner to record approximately 200 CD discs in the said memory, whereby the discs in even a quite large collection may be loaded with an uncritical orientation and yet be stopped with a critical orientation, when only the disc exhibited this orientation by the first loading thereof.

We claim:

1. A player apparatus for compact discs (CD discs) and similar signal carriers, comprising a playing station with means for holding and rotating such discs and pick-up means for detecting the signals thereof, and further of the type comprising a magazine for two or more discs and means for selectively bringing any of these discs into and out of operative engagement with the playing station, characterized in that the player is provided with a number of stationary disc holder stations arranged in a linear formation on a chassis so as to be operable to hold a linear row of respective discs side by side in a common plane, while at least the pick-up means of the playing station are provided on a sledge operable to be displaced along said chassis so as to be selectively operatively engageable with the individual discs in said row of discs in which the entire row of said disc holder stations is visually exposed, except for any such station covered by the playing station, in which means are provided for effecting stoppage of played discs in positions with generally the same orientation of imprints on the discs, in which an associated memory unit serves to register an identification signal of each new disc in a relevant disc collection and, in response to initial playing of said disc, also serves to register an angle of rotation of the disc from a starting position thereof to a position in which the pick-up means detects a passage of the 'pause bit' of the CD disc, said memory unit thereafter serving to effect stoppage of the rotation of the disc with an orientation thereof corresponding to the orientation with which it was originally placed in the player.

2. A player according to claim 1, in which the playing station as a whole, including the disc rotation means, is arranged on said sledge.

3. A player according to claim 1, in which the disc holder stations are provided with gripping means co-operating with the outer periphery of the discs so as to effectively hold the discs irrespective of the orientation of the player in the space, said gripping means being releasable so as to enable a disc replacement as well as in response to a selected disc being operatively engaged by the displaceable playing station.

4. A player according to claim 1, in which the row of said disc holder stations is covered by a transparent lid.

* * * * *